United States Patent
Burnett et al.

(10) Patent No.: US 9,816,797 B1
(45) Date of Patent: Nov. 14, 2017

(54) MODULAR ANGULAR ALIGNMENT CLOCKING MECHANISM

(71) Applicant: The United States of America, as represented by the Secretary of the Navy, Washington, DC (US)

(72) Inventors: Donald L. Burnett, Ridgecrest, CA (US); Aaron D. Joy, Ridgecrest, CA (US); Matthew C. Jorgensen, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 280 days.

(21) Appl. No.: 14/806,768

(22) Filed: Jul. 23, 2015

(51) Int. Cl.
*G01B 5/25* (2006.01)

(52) U.S. Cl.
CPC ...................... *G01B 5/25* (2013.01)

(58) Field of Classification Search
CPC ........................................................ G01B 5/25
USPC ...................... 33/1 N, 529; 285/184; 29/466; 403/104, 325
See application file for complete search history.

(56) References Cited

U.S. PATENT DOCUMENTS

| | | | | |
|---|---|---|---|---|
| 4,674,774 A | * | 6/1987 | Williams | F16D 1/02 285/184 |
| 5,185,936 A | * | 2/1993 | McMurtry | B23Q 16/08 33/1 D |
| 5,474,334 A | * | 12/1995 | Eppink | E21B 7/067 175/74 |
| 5,893,589 A | * | 4/1999 | Bleitz | F16L 37/12 285/148.19 |
| 6,581,288 B1 | * | 6/2003 | Rybkoski | B60B 27/00 29/244 |
| 7,484,312 B2 | * | 2/2009 | Morgan | B21D 28/125 29/465 |
| 7,871,080 B2 | * | 1/2011 | Marini | B23D 51/10 279/140 |
| 8,955,209 B2 | * | 2/2015 | Dyer | B23K 1/0008 29/464 |
| 9,573,195 B2 | * | 2/2017 | Schneider | B23B 31/1071 |
| 2011/0140411 A1 | * | 6/2011 | Marchand | E21B 7/067 285/184 |
| 2015/0041116 A1 | * | 2/2015 | Beisel | E21B 33/05 166/90.1 |

\* cited by examiner

*Primary Examiner* — Christopher Fulton
(74) *Attorney, Agent, or Firm* — James M. Saunders (57) ABSTRACT

A modular angular alignment clocking mechanism employs a hollow housing, a threaded interface ring, and a compression spring. The threaded interface ring is inserted into the housing and is followed by the compression spring. The housing is configured to thread onto one cylinder. Another cylinder is then threaded into the threaded interface ring and torqued to specification after clocking.

12 Claims, 7 Drawing Sheets

MODULAR ANGULAR ALIGNMENT CLOCKING MECHANISM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to clocking mechanisms.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Current methods of interfacing guidance kits with rocket systems have very little to no modularity and require external clamps, set screws, and tools to implement. Physical alignment of parts has historically relied upon certain types of couplings and/or fasteners that require tooling and space to operate and lock the mechanisms. Electronic substitutions have been implemented in certain instances and require sensors to be present in all sections of the mating objects.

Embodiments of the invention provide for clocking one cylinder compared to another cylinder without the use of tools or fasteners. Embodiments of the invention also achieve modularity with varying platforms by being scalable. Component materials are selected for corrosion resistance with minimal thread galling so that embodiments of the invention may be used in exposed environments. These aspects are crucial in a field environment where tools are sometimes not available. Applicability of embodiments of the invention is robust, ranging from 2.75 inch and greater rockets to provide modular and clockable mid-body warheads. Additionally, embodiments of the invention may be used in applications where two cylinders need to be coupled and clocked without using fasteners or special tools. As such, embodiments of the invention are directed to acting on two cylinders by coupling the two cylinders together in a work piece environment.

Embodiments of the invention are directed to a modular angular alignment clocking mechanism, sometimes referred to as a MAACM, which allows the angular position of a guidance kit's control surfaces to be clocked to a desired orientation in reference to rocket motor control surfaces. Depending on application-specifics, including cylinder diameters, the resulting clocking resolution is between ±1 degree to ±5 degrees. In embodiments of the invention, the term "resolution" is synonymous with accuracy. Likewise, the term "clocking," and the like refers to a designated angular reference of one cylinder to another cylinder.

Although embodiments of the invention are described in considerable detail, including references to certain versions thereof, other versions are possible such as, for example, orienting and/or attaching components in different fashion. Therefore, the spirit and scope of the appended claims should not be limited to the description of versions included herein. Additionally, other variations, of course, are possible without detracting from the merits or generalities of embodiments of the invention. Several views are presented to depict some, though not all, of the possible orientations of embodiments of the invention.

Modular Angular Alignment Clocking Mechanism

Figure 1A:
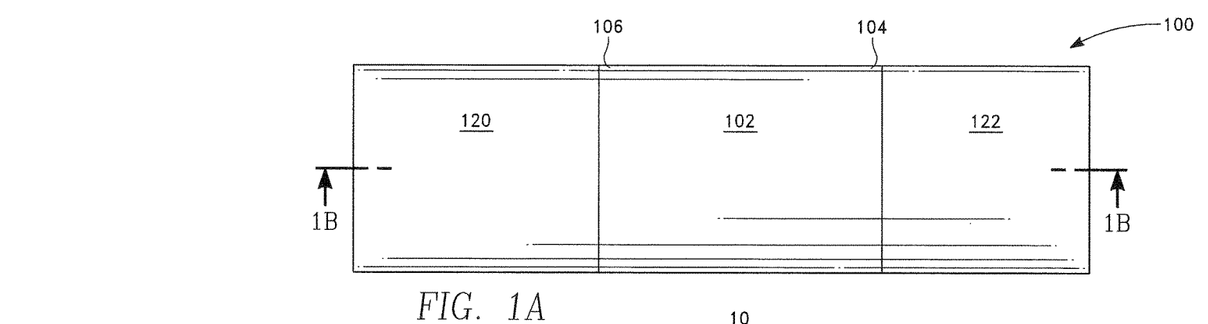
FIG. 1A is side view of an assembly showing a housing, a first cylinder, and a second cylinder, according to some embodiments of the invention.

In the accompanying drawings, like reference numbers indicate like elements. Reference character 10 depicts an apparatus of embodiments of the invention. Referring simultaneously to FIGS. 1A through 7C, embodiments of the invention generally relate to a modular angular alignment clocking mechanism 10, sometimes referred to as a connector, apparatus, or device. The apparatus 10 may be used in an assembly with other components, such as is shown in FIGS. 1A & 1B.

Figure 1B:
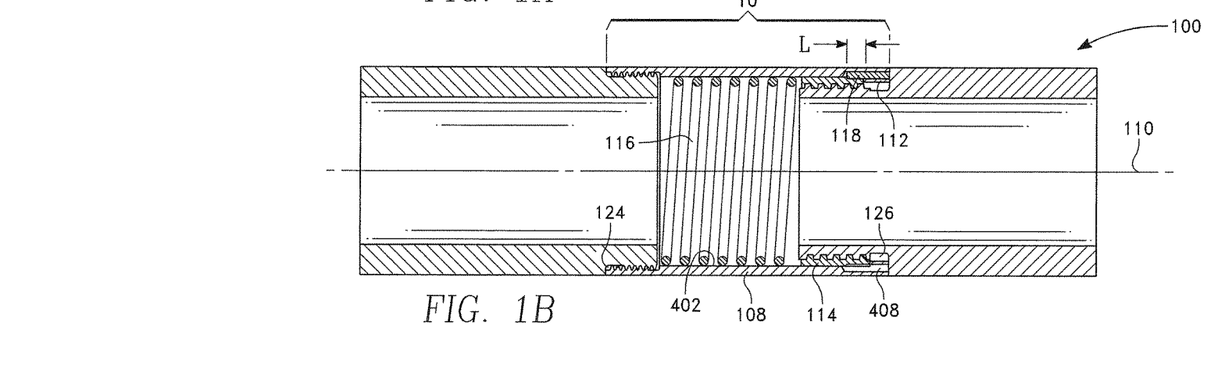
FIG. 1B is section view of the assembly (shown in FIG. 1A) and perpendicular to cut plane 1B-1B of FIG. 1A, according to some embodiments of the invention.

FIGS. 1A & 1B illustrate a modular alignment clocking mechanism assembly 100 from a side view and a section view, respectively. Referring simultaneously to FIGS. 1A, 1B, 4A through 7C, an embodiment of the invention is directed to a modular angular alignment clocking mechanism 10. The clocking mechanism 10 includes a hollow housing 102 having a first end 104 and a second end 106. The hollow housing 102 has an interior surface 402 and an exterior surface 404 defining a cylinder wall 108. A central longitudinal axis 110 spans from the first end 104 to the second end 106 of the hollow housing 102. The central longitudinal axis 110 is common to the all components in embodiments of the invention and may, therefore, be referred to as a common longitudinal axis and used as a reference for component orientation. The commonality of the central longitudinal axis 110 is evident by referring to the accompanying figures.

The cylinder wall 108 has a motion stop 112, which may also be referred to as a "lost motion edge" or a "lip," on the interior surface 402 and located at the first end 104 of the housing 102. The interior surface 402 has an interior threaded portion 406 at the second end 106 of the housing 102. At least two longitudinal apertures 408 are formed in the cylinder wall 108 at the first end 104 of the housing 102. The longitudinal apertures 408 are oriented parallel with the central longitudinal axis 110. The longitudinal apertures 408 transition to terminal slots, depicted as reference character 410, in the cylinder wall 108. The terminal slots 410 assist with limiting the dowel pin (118) driven distance as discussed below. The longitudinal apertures/terminal slots 408/410 features, in conjunction with the dowel pins 118, are positioned at about the same radius from the central longitudinal axis 110.

A threaded interface ring 114 (FIGS. 1B & 5A through 5D) is sometimes referred to as a threaded insert. The threaded interface ring 114 is configured for removable insertion longitudinally into the second end 106 of the hollow housing 102. A compression spring 116 is configured for removable insertion longitudinally into the second end 106 of the hollow housing 102 and juxtaposed against the threaded interface ring 114. The interior surface 402 of the hollow housing 102 circumscribes the compression spring 116 and the threaded interface ring 114, but is not tight, which allows a user to remove the compression spring and the threaded interface ring, if necessary. At least one raised feature, such as at least one dowel pin 118, is present on the interior wall of the housing 402 spanning from the motion stop 112 towards the second end 106 of the housing 102, a distance L (shown in FIG. 1B) longitudinally aligned with the central longitudinal axis 110 to engage with a plurality of teeth 506 in the threaded interface ring 114. The plurality of teeth 506 may, at times, be referred to as clocking teeth or grooves without detracting from the merits of or generality of embodiments of the invention.

A range of about one to about six raised features, which may be dowel pins (depicted as reference character 118) is expected in most configurations, but both the number and size of raised features is application-specific in order to accommodate for the torque loads and materials selected for the mechanism components. The raised features could be manufactured in a variety of ways, being monolithic with the housing or present through assembly (such as dowel pins).

Figure 7A:
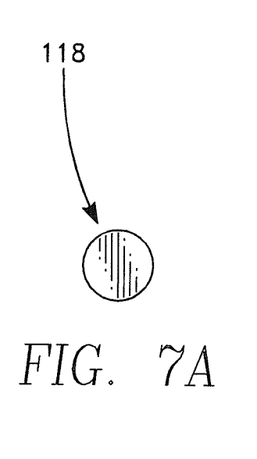
FIG. 7A is a view of a first end (showing the crown) of a dowel pin (shown in FIG. 1B), according to some embodiments of the invention.
Figure 7B:
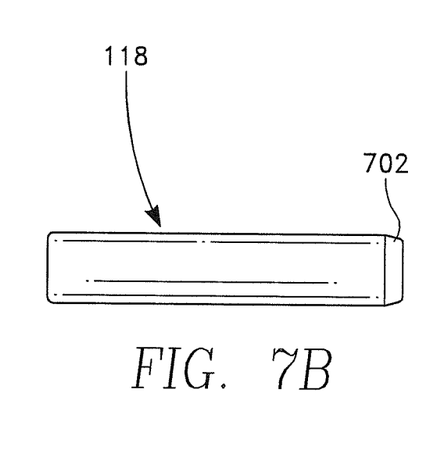
FIG. 7B is a side view of the dowel pin (shown in FIGS. 1B & 7A), according to some embodiments of the invention.
Figure 7C:
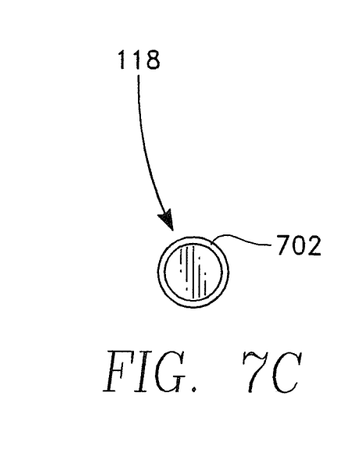
FIG. 7C is a view of a second end (showing the point) of the dowel pin (shown in FIGS. 1B & 7B), according to some embodiments of the invention.

In the assembly shown in FIGS. 1A & 1B, at least one dowel pin 118 is compression fit in the longitudinal aperture 408 to create the raised feature. As shown in FIG. 7B, American National Standards Institute (ANSI) hardened ground machine dowel pins were selected in one prophetic example, but if dowels are used to create the raised features, dowel choice is application specific.

FIG. 7B depicts one of many examples of dowels pins that may be used in embodiments of the invention. In FIG. 7B, the dowel pins are beveled on one end 702. In some embodiments, the dowel pins 118 are configured to be inserted beveled end 702 first into the longitudinal apertures 408 and, therefore, driven by force on the crown end (the view shown in FIG. 7A). This orientation allows the beveled end 702 to engage with the grooves 506 on the threaded interface ring 114. In other embodiments, the dowel pins 118 may be inserted with the crown end (the view shown in FIG. 7A) first into the longitudinal apertures 408, with the beveled end 702 being driven.

Notwithstanding the particular type of dowel pin 118 employed, the dowel pins 118 are configured to engage with grooves 506 on the threaded interface ring 114. The dowel pins 118 may be thought of as a compression fit, pin and slot connection, or friction fit in conjunction with the longitudinal apertures 408 and terminal slots 410.

Figure 5A:
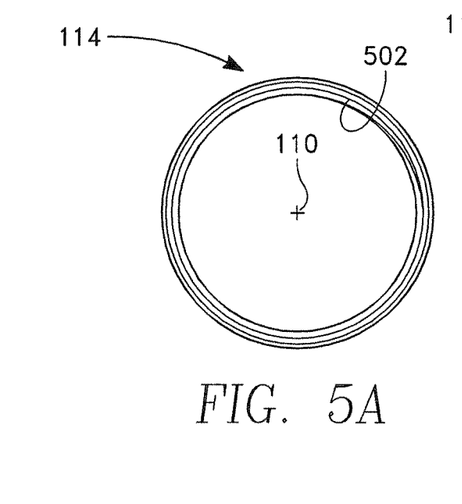
FIG. 5A is a view of the aft end of the threaded insert ring (shown in FIG. 1B), according to some embodiments of the invention.
Figure 5B:
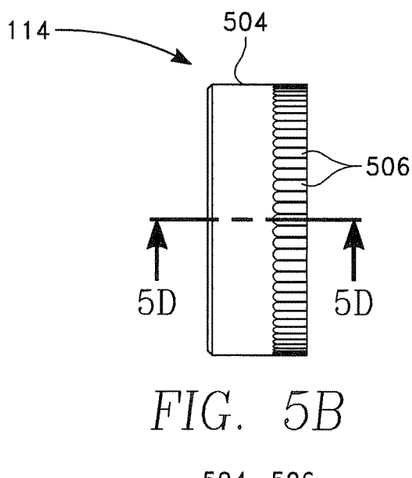
FIG. 5B is a side view of the threaded insert ring (shown in FIGS. 1B & 5A), according to some embodiments of the invention.

The threaded interface ring 114 has a threaded inner surface 502. The threaded interface ring 114 also has an outer surface 504. As shown in FIG. 5B, the outer surface 504 is partially smooth. A plurality of clocking teeth 506 are etched into the outer surface 504. The clocking teeth 506 may partially span (longitudinally) the outer surface 504 of the threaded interface ring 114 (as shown in FIG. 5B) or, conversely, may span the entire outer surface of the threaded interface ring, such that the area shown to be smooth on FIG. 5B would instead be entirely etched longitudinally (parallel with the central longitudinal axis 110) with the clocking teeth.

Figure 5C:
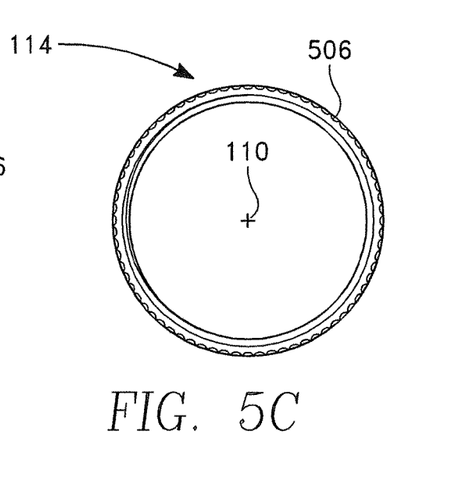
FIG. 5C is a view of the front end of the threaded insert ring (shown in FIGS. 1B & 5B), according to some embodiments of the invention.
Figure 5D:
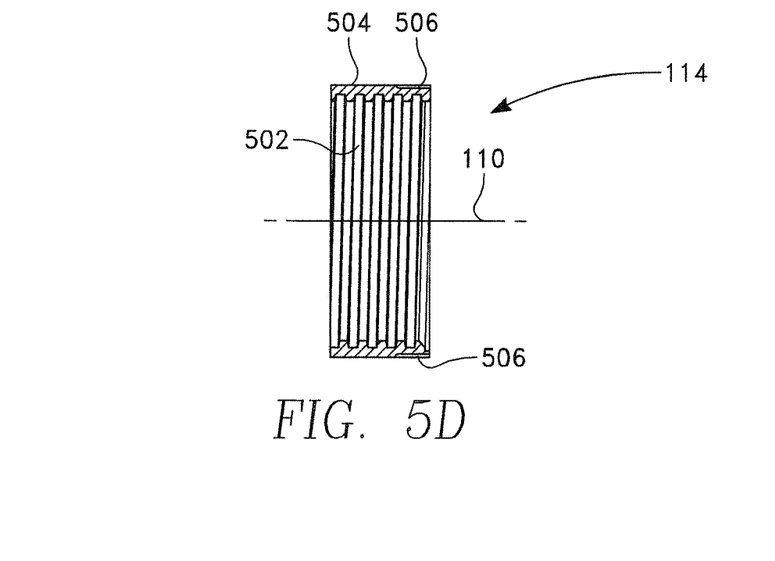
FIG. 5D is a section view of the threaded insert ring (shown in FIGS. 1B & 5B) and perpendicular to cut plane 5D-5D of FIG. 5B, according to some embodiments of the invention.
Figure 6A:
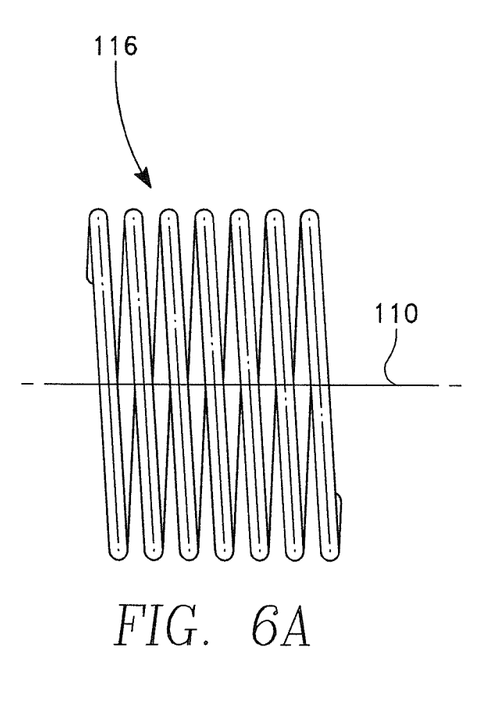
FIG. 6A is a side view of the compression spring (shown in FIG. 1B), according to some embodiments of the invention.
Figure 6B:
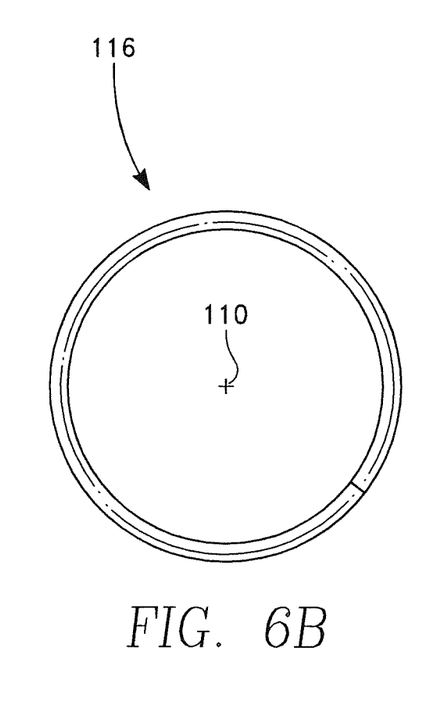
FIG. 6B is a front end view of the compression spring (shown in FIGS. 1B & 6A), according to some embodiments of the invention.

The clocking teeth 506 are axially spaced at equal distance along the outer surface 504 at a spacing range of about 2 to about 10 degrees, which corresponds to +/−1 degree to +/−5 degrees clocking resolution. FIGS. 5B & 5C show the clocking teeth 506 at a spacing of 5 degrees, corresponding to +/−2.5 degree resolution. The threaded interface ring 114 is held in place between the compression spring 116 and the motion stop 112. As such, removal of the compression spring 116 will allow the threaded interface ring 114 to be removed from the housing 102. A threaded interface ring 114 with different threads could then be inserted into the housing 102, which provides for increased modularity.

Assembly Embodiment

Referring simultaneously to FIGS. 1A through 7C, another embodiment of the invention relates to a modular angular alignment clocking mechanism assembly. The assembly includes a first cylinder 120 having a proximal end 208, a distal end 210, and a threaded outer surface portion 212 on the proximal end of the first cylinder. The threaded outer surface portion 212 on the proximal end 208 of the first cylinder 120 is configured to threadingly-engage with the interior threaded portion 406 of the hollow housing 102.

A second cylinder 122 has a proximal end 308 and a distal end 310, and a threaded outer surface portion 312 on the proximal end of the second cylinder. The threaded outer surface portion 312 on the proximal end 308 of the second cylinder 122 is configured to threadingly-engage with the threaded inner surface 502 of the threaded interface ring 114. Thus, more simply stated, the first cylinder 120 threads into the interior of the hollow housing 102 and the second cylinder 122 threads into the interior of the threaded interface ring 114.

Figure 2A:
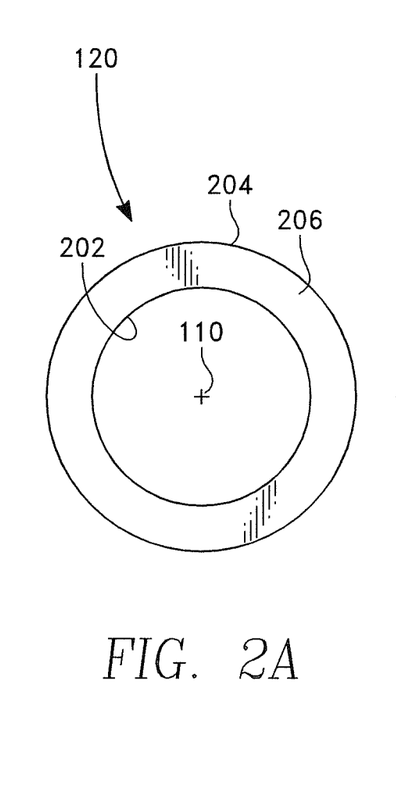
FIG. 2A is a view of the distal end of the first cylinder (shown in FIG. 1A), according to some embodiments of the invention.
Figure 2B:
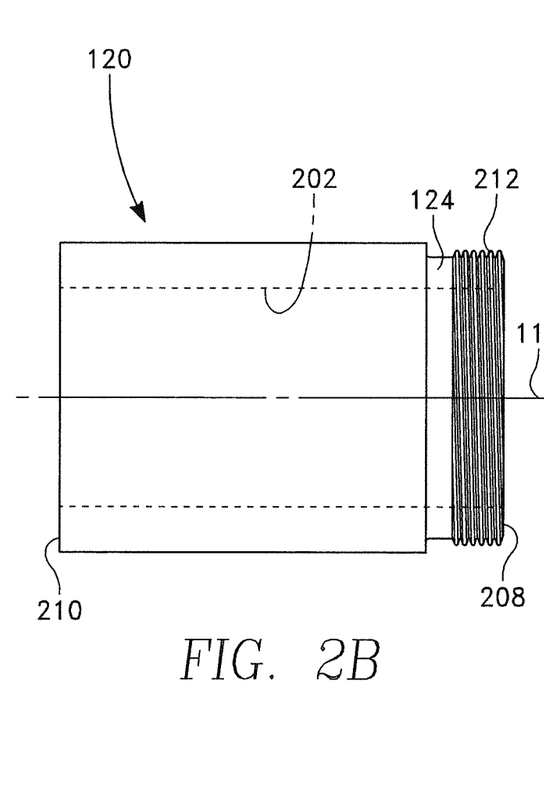
FIG. 2B is a side view of the first cylinder (shown in FIGS. 1A & 2A), according to some embodiments of the invention.
Figure 2C:
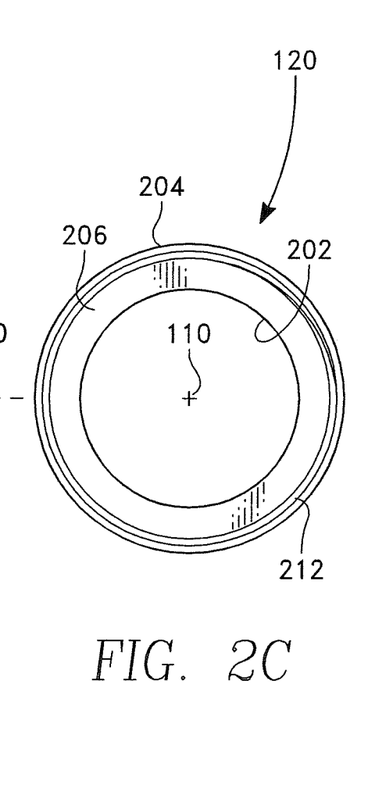
FIG. 2C is a view of the proximal end of the first cylinder (shown in FIGS. 1A & 2B), according to some embodiments of the invention.
Figure 3A:
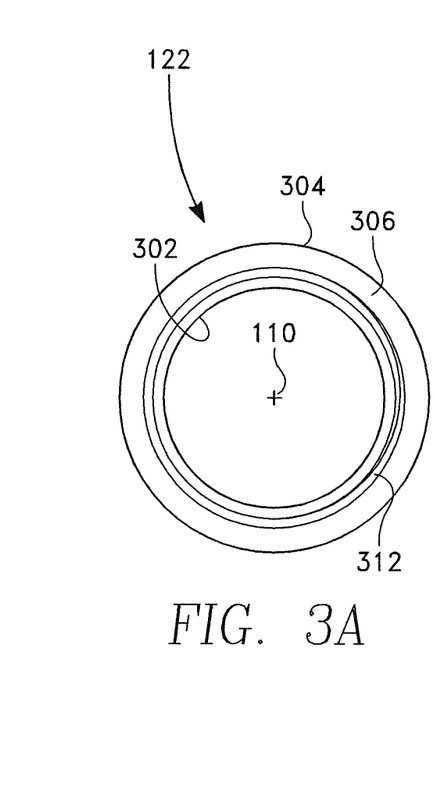
FIG. 3A is a view of the proximal end of the second cylinder (shown in FIG. 1A), according to some embodiments of the invention.
Figure 3B:
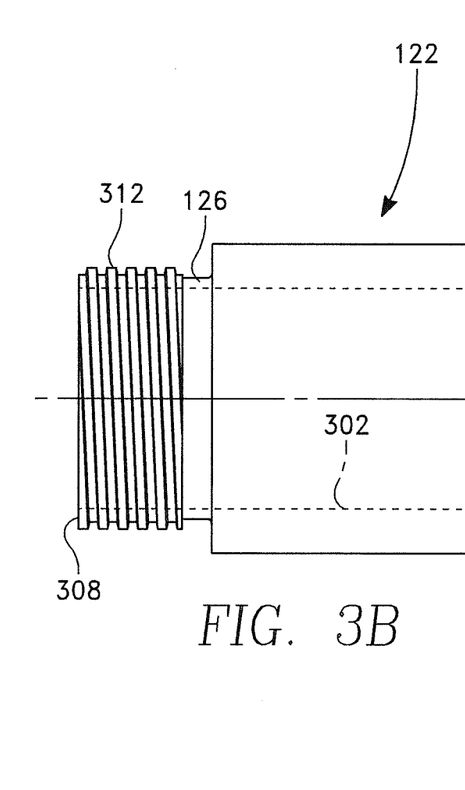
FIG. 3B is a side view of the second cylinder (shown in FIGS. 1A & 3A), according to some embodiments of the invention.
Figure 3C:
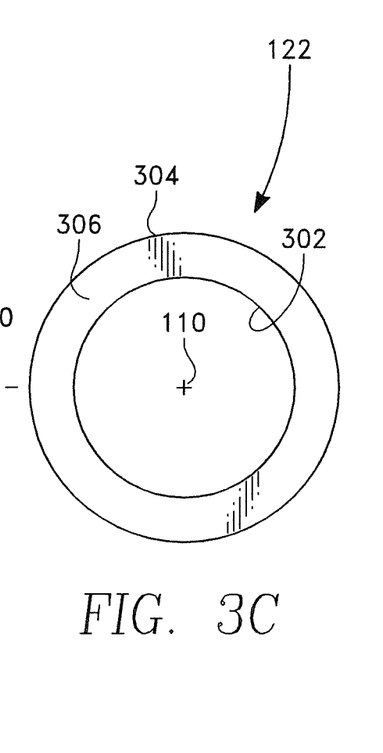
FIG. 3C is a view of the distal end of the second cylinder (shown in FIGS. 1A & 3B), according to some embodiments of the invention.
Figure 4A:
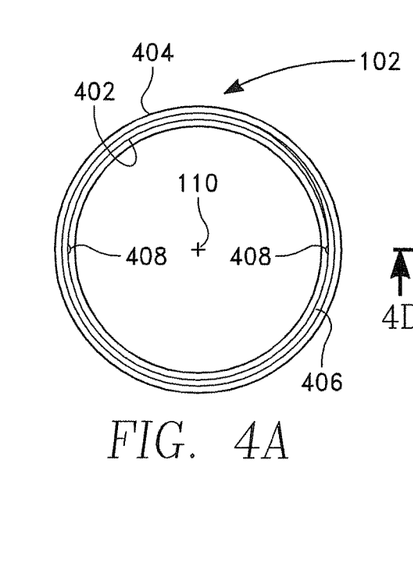
FIG. 4A is a view of the second end of the housing (shown in FIG. 1A), according to some embodiments of the invention.
Figure 4B:
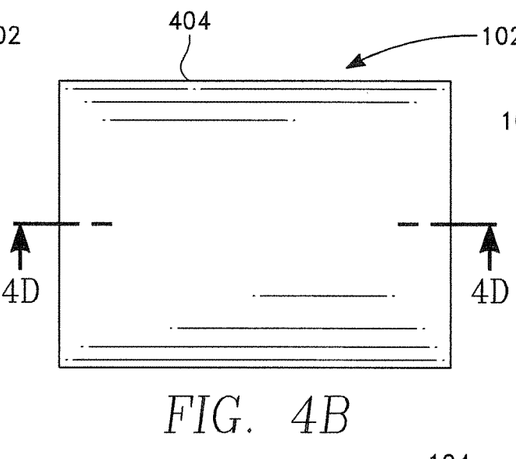
FIG. 4B is a side view of the housing (shown in FIGS. 1A & 4A), according to some embodiments of the invention.
Figure 4C:
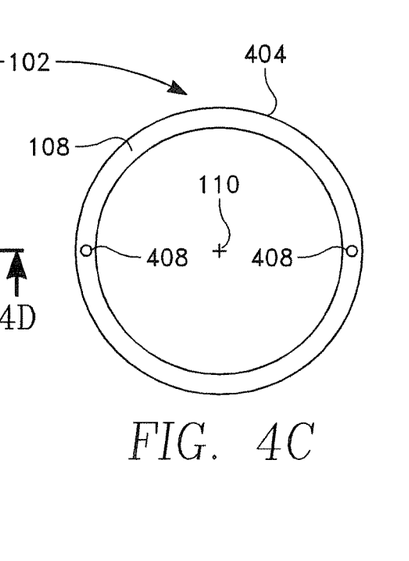
FIG. 4C is a view of the first end of the housing (shown in FIGS. 1A & 4B), according to some embodiments of the invention.
Figure 4D:
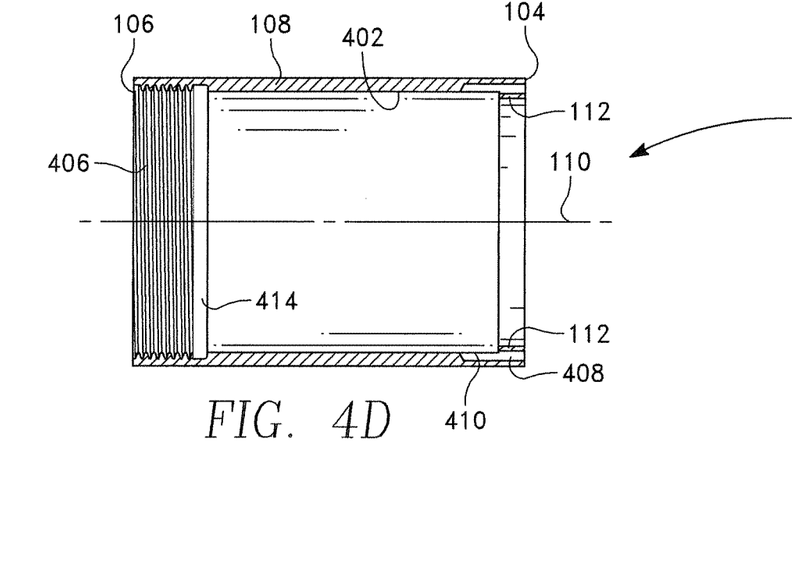
FIG. 4D is a section view of the housing (shown in FIG. 4B) and perpendicular to the cut plane 4D-4D of FIG. 4B, according to some embodiments of the invention.

As shown in FIGS. 1B, 2B, & 3B, both the first and second cylinders 120 & 122 have respective thread relief areas, depicted as reference characters 124 & 126, respectively. Additionally, the hollow housing 102 also has a thread relief area shown as reference character 414 in FIG. 4D. Furthermore, both the first and second cylinders 120 & 122 have respectively inner 202/302 and outer 204/304 surfaces forming their respective cylinder walls 206 & 306.

Additional Features Applicable to Embodiments of the Invention

In some embodiments, the compression spring 116 has an axial spring force range of about 5 pounds to about 14 pounds, measured longitudinally along the central longitudinal axis 110. In other embodiments, the compression spring 116 has a maximum axial spring force of about 14 pounds, measured longitudinally along the central longitudinal axis 110. The disclosed spring force is sufficiently low enough to allow an individual user to operate the clocking mechanism 10 by hand. The axial spring force used is application-specific and will generally increase in magnitude as the mechanism size increases. In those embodiments where the mechanism 10 is sufficiently large such as, for example, in heavy industrial applications, hand operation is inhibited because the corresponding necessary axial spring force will be very large. However, the concepts of embodiments of the invention are equally applicable in heavy industrial applications.

Embodiments of the invention make use of a one quarter inch pin engagement length, designated on FIG. 1B as the letter L (L=¼ inch), with the plurality of clocking teeth 506. A person having ordinary skill in the art will recognize that the dowels pins 118 have their own axis (not shown in the associated figures for ease of view) and the dowel pins axis is located at or very near to the inner diameter of the housing 102. The dowel pins 118 are configured to engage with the plurality of clocking teeth 506 over the ¼ inch pin engagement length, L, to keep the threaded interface ring 114 from rotating in the housing. The size and material strength of the dowel pins 118, threaded interface ring 114, and plurality of clocking teeth 506 are selected such that the material will not yield under torque load.

Some embodiments may include a viewing area through the housing wall 108 to expose the outer surface 504 of the threaded interface ring 114 for viewing the engagement of the dowel pins 118 with the plurality of clocking teeth 506, allowing a user to view the angular measurements of the clocking mechanism 10. The viewing area is not specifically shown in the accompanying drawings for ease of viewing. In some embodiments, the viewing area is a window. In other embodiments, the viewing area is a recessed area. Additionally, all embodiments, whether a viewing area is employed or not, allow for the user to determine the clocking of the mechanism 10, which is the determination of the designated angle reference of the first cylinder 120 to the second cylinder 122. When a viewing area is not used, the user will count the number of clocking teeth 506 turned past a reference mark (existing on the housing). Knowing the number of clocking teeth 506 allows the user to determine the angular offset of the first cylinder 120 compared to the second cylinder 122, and also whether the first and second cylinders are properly aligned with one another.

The housing 102 may be opaque, transparent, or a combination of both, such as part of the housing being opaque and part being transparent. The housing 102 is appropriately sized to provide at least one area for including instructions. The area for instructions is any portion of the exterior surface 404 of the housing 102. The instructions may be color labels, numbers, or written instructions assisting the user in determining the proper order of internal components for insertion inside the housing 102. The instructions may also be metal stamped or etched into the exterior surface 404 of the housing 102. Similarly, the apparatus 10 may be included in a kit or a pouch and may include more detailed instructions within the kit or pouch.

Component materials are selected based on application-specific conditions. Thus the components may be selected from any of several suitable materials without detracting from the merits or generalities of embodiments of the invention. Therefore, as an example, the housing 102, threaded interface ring 114, compression spring 116, and dowel pins 118 may be steel, stainless steel, steel alloy, aluminum, and brass. Additionally, the described components may also be made of polymers such as, for example, plastics including, but not limited to, polyvinyl chloride (PVC) and high density polyethylene (HDPE). Furthermore, the compression spring 116 may be replaced with structural features providing the disclosed axial force (the axial spring force). Examples of replacements for the compression spring 116 include, but are not limited to, foam inserts, elastomeric inserts such as silicone and latex rubber, and polymeric inserts such as urethanes and polytetrafluoroethylene.

The threaded interface ring 114 may contain a nylon thread insert, coating, or like device on the threaded inner surface 502 to help hold onto the second cylinder 122 in order to assist with the function of the clocking mechanism 10. The insert, coating, or similar assists in the function of the clocking mechanism by allowing the second cylinder 122 and threaded interface ring 114 to rotate in unison in reference to the dowel pins 118.

Using Embodiments of the Invention

As described, embodiments of the invention couple two cylinders, referred to as first and second cylinders 120 & 122. The first and second cylinders 120 & 122 may be hollow or solid. The threaded interface ring 114 is inserted into the housing 102, followed by the compression spring 116. The motion stop 112 is internal to the housing 102 and prevents the threaded interface ring 114 (and compression spring 116) from moving out of the first end 104 of the housing 102. The housing 102 is threaded onto the first cylinder 120. The second cylinder 122 is then threaded into the threaded interface ring 114 and torqued to specification based on application-specific conditions after clocking (if clocking is desired) has been accomplished.

The dowel pins 118 in the housing 102 act as keys to the plurality of clocking teeth 506 that are machined in the threaded interface ring 114. The dowel pins 118 may, therefore, for simplicity, be referred to as keys or housing keys since the dowel pins are secured to the housing 102. The plurality of clocking teeth 506 are sometimes referred to as threaded interface ring teeth or simply as teeth or grooves. As described earlier, FIG. 5B shows the plurality of clocking teeth 506 machined at 5 degree intervals in the threaded interface ring 114. The compression spring 116 keeps the threaded interface ring teeth 506 engaged with the housing keys (the dowel pins 118).

Clocking of embodiments of the invention is user-friendly. Referring to FIGS. 1B, 3B, 4D, 5B, 5D, 6A, & 6B, the compression spring 116 is used to apply force to the threaded insert ring 114 to ensure that the threaded insert ring is engaged with the second cylinder 122 and does not spin freely. Thus, when the second cylinder 122 (attached to the threaded interface ring 114) is backed off a minimum amount (the engagement distance, L) and an axial force is applied to compress the compression spring 116 a minimum distance, L, the teeth 506 and keys 118 are disengaged from each other, allowing the threaded interface ring 114 and associated second cylinder 122 to rotate freely in reference to the first cylinder 120. This, in turn, permits rotation to a desired clocked position to occur. When the desired angular rotation location is reached, the axial force is removed and the compression spring 116 is allowed to push the threaded interface ring teeth 506 into the keys 118, thus locking the mechanism 10 from rotating. The assembly is then torqued to specification which pinches the housing 102 between the threaded interface ring 114 and the connecting cylinder (the second cylinder 122), thus locking the entire assembly in place. A person having ordinary skill in the art will recognize that the teeth 506 and keys 118, therefore, are similar to a tooth and groove mechanism.

Modularity of embodiments of the invention is achieved by machining the desired threaded inner surface 502 into the threaded interface ring 114. The apparatus 10 can be disassembled, a threaded interface ring 114 having the incorrect threads can be removed from the housing 102, and a new threaded interface ring having the proper threads can then be inserted into the housing. Thus, the housing 102, dowel pins 118, and compression spring 116 are maintained as components in embodiments of the invention to incorporate differently-sized threaded interface rings 114, including different thread types.

The modularity offers the opportunity to exchange different threaded interface rings with cylinders (the second cylinder 122) having varying thread geometry (diameters, pitch, type, class). In military environments, for example, this allows different guidance kits to be used on the same mid-body platform. It is also apparent that the clocking mechanism 10 can be used in environments having varying sized threaded interfaces, such as in industrial process systems and, of course, numerous plumbing applications. The modularity of the threaded interface ring 114 has an added benefit, for example, in military applications where threads are at high risk of being marred, cross threaded, damaged, or worn easily. Instead of having to replace or dispose of an entire assembly or system, only a single part (the threaded interface ring 114) need be replaced.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A modular angular alignment clocking mechanism, comprising:
   a hollow housing having a first end, a second end, an interior surface, an exterior surface, a cylinder wall defined by said interior surface and said exterior surface, and a central longitudinal axis spanning from said first end to said second end of said hollow housing, said cylinder wall having a motion stop on said interior surface at said first end, said interior surface of said hollow housing having an interior threaded portion at said second end;
   at least one longitudinal aperture in said cylinder wall, said at least one longitudinal aperture oriented parallel with said central longitudinal axis and positioned at said first end of said hollow housing, said at least one longitudinal aperture transitioning to a terminal slot in said cylinder wall;
   a threaded interface ring configured for removable insertion longitudinally into said second end of said hollow housing, wherein said interior surface of said hollow housing circumscribes said threaded interface ring;
   a compression spring configured for removable insertion longitudinally into said second end of said hollow housing and juxtaposed against said threaded interface ring, wherein said interior surface of said hollow housing circumscribes said compression spring;
   wherein said threaded interface ring, comprising:
      a threaded inner surface and an outer surface;
      a plurality of clocking teeth etched into said outer surface;
      wherein said plurality of clocking teeth are axially spaced at equal distance along said outer surface, said spacing at a range of about 2 to 10 degrees;
      said threaded interface ring positioned between said compression spring and said motion stop; and
   at least one dowel pin compression fit in said at least one longitudinal aperture.

2. The mechanism according to claim 1, said compression spring having an axial spring force range of about 5 pounds to about 14 pounds, as measured longitudinally along said central longitudinal axis.

3. The mechanism according to claim 1, said compression spring having a maximum axial spring force of about 14 pounds, as measured longitudinally along said central longitudinal axis.

4. The mechanism according to claim 1, further comprising a viewing area in said exterior surface of said hollow housing, said viewing area configured for determining angular measurements corresponding to said axial spacing of said plurality of clocking teeth.

5. The mechanism according to claim 4, wherein said viewing area is a window.

6. The mechanism according to claim 4, wherein said viewing area is a recessed area.

7. A modular angular alignment clocking mechanism assembly, comprising:
   a hollow housing having a first end, a second end, an interior surface, an exterior surface, a cylinder wall defined by said interior surface and said exterior surface, and a central longitudinal axis spanning from said first end to said second end of said hollow housing, said cylinder wall having a motion stop on said interior surface at said first end, said interior surface of said hollow housing having an interior threaded portion at said second end;
at least one longitudinal aperture in said cylinder wall, said at least one longitudinal aperture oriented parallel with said central longitudinal axis and positioned at said first end of said hollow housing, said at least one longitudinal aperture transitioning to a terminal slot in said cylinder wall;
a threaded interface ring configured for removable insertion longitudinally into said second end of said hollow housing, wherein said interior surface of said hollow housing circumscribes said threaded interface ring;
a compression spring configured for removable insertion longitudinally into said second end of said hollow housing and juxtaposed against said threaded interface ring, wherein said interior surface of said hollow housing circumscribes said compression spring;
at least one dowel pin compression fit in said at least one longitudinal aperture;
a first cylinder having an proximal end, a distal end, and a threaded outer surface portion on said proximal end of said first cylinder, said threaded outer surface portion on said proximal end of said first cylinder configured to engage with said interior threaded portion of said hollow housing;
wherein said threaded interface ring, comprising:
 a threaded inner surface and an outer surface;
 a plurality of clocking teeth etched into said outer surface;
 wherein said plurality of clocking teeth are axially spaced at equal distance along said outer surface, said spacing at a range of about 2 to 10 degrees;
 said threaded interface ring positioned between said compression spring and said motion stop; and
a second cylinder having an proximal end and a distal end, and a threaded outer surface portion on said proximal end of said second cylinder, said threaded outer surface portion on said proximal end of said second cylinder configured to engage with said threaded inner surface of said threaded interface ring.

8. The mechanism according to claim 7, said compression spring having an axial spring force range of about 5 pounds to about 14 pounds, as measured longitudinally along said central longitudinal axis.

9. The mechanism according to claim 7, said compression spring having a maximum axial spring force of about 14 pounds, as measured longitudinally along said central longitudinal axis.

10. The mechanism according to claim 7, further comprising a viewing area in said exterior surface of said hollow housing, said viewing area configured for determining angular measurements corresponding to an angular reference of said first cylinder compared to said second cylinder.

11. The mechanism according to claim 10, wherein said viewing area is a window.

12. The mechanism according to claim 10, wherein said viewing area is a recessed area.

\* \* \* \* \*